Dec. 13, 1966 G. GUTZEIT 3,291,199
COMBINATION HEATING AND COOLING SYSTEM INCORPORATING
A FLAMELESS COMBUSTION HEATER OF
THE CATALYTIC TYPE
Filed Sept. 25, 1963 7 Sheets-Sheet 2
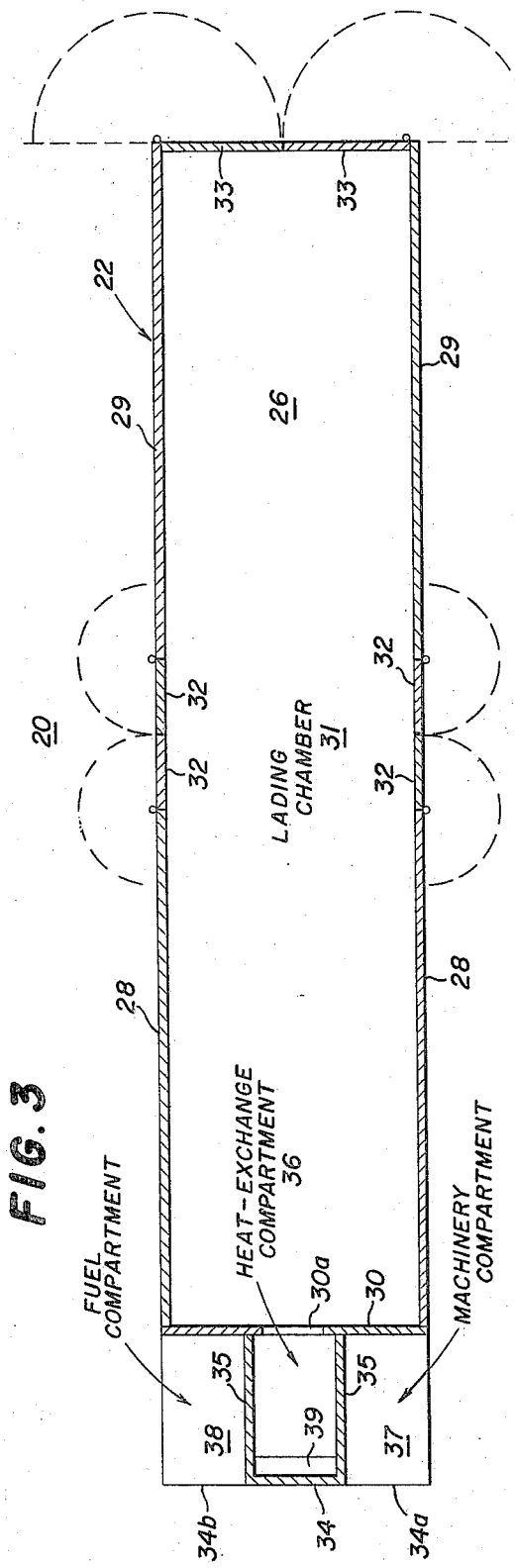
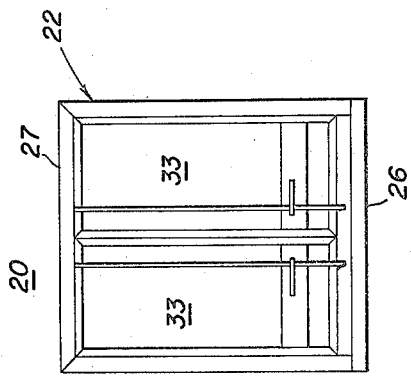
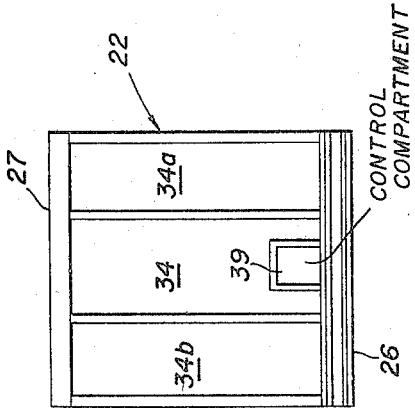
INVENTOR.
GREGOIRE GUTZEIT
BY
Pringley, Baird, Clayton,
Miller & Vogel,
ATTYS.

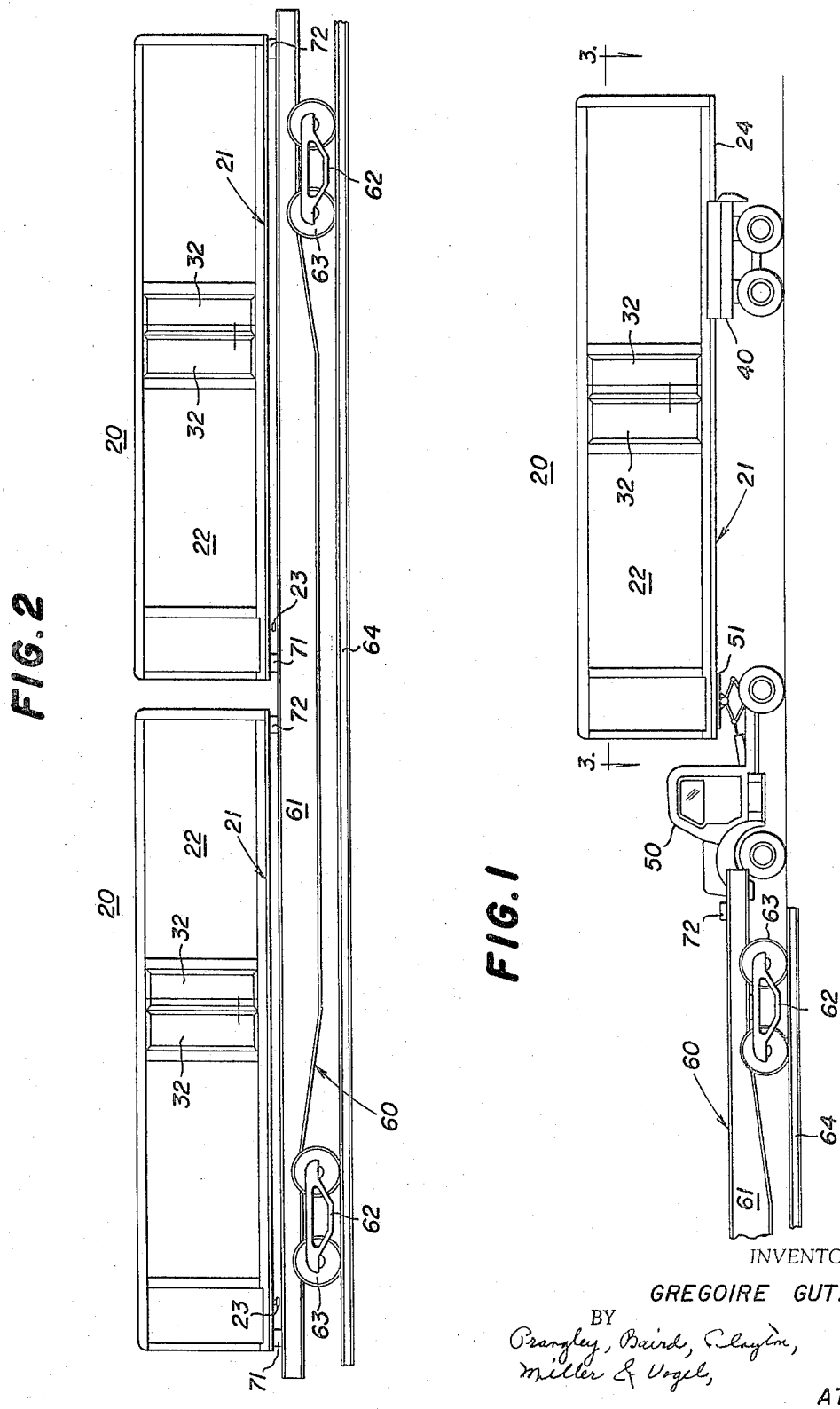

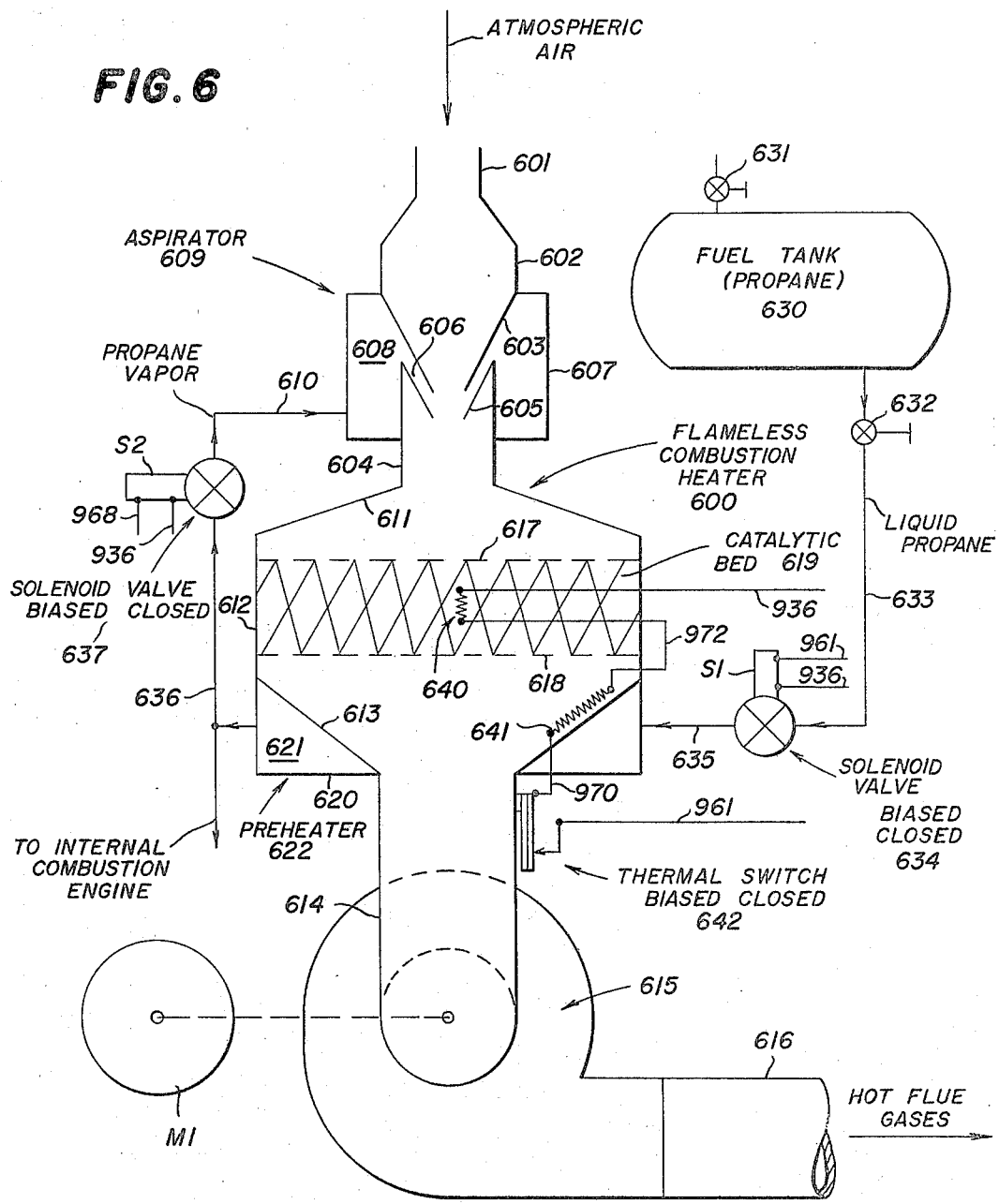

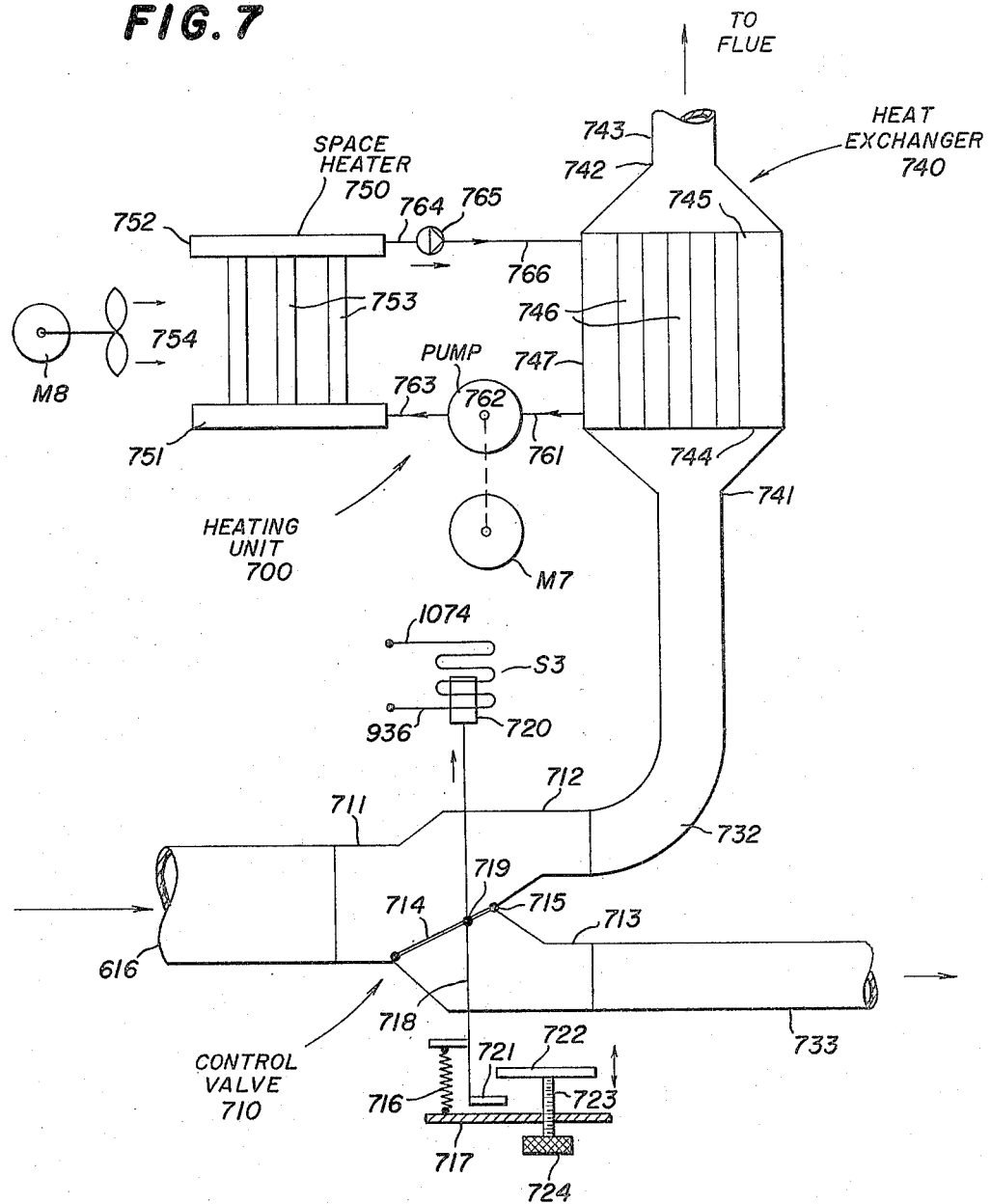

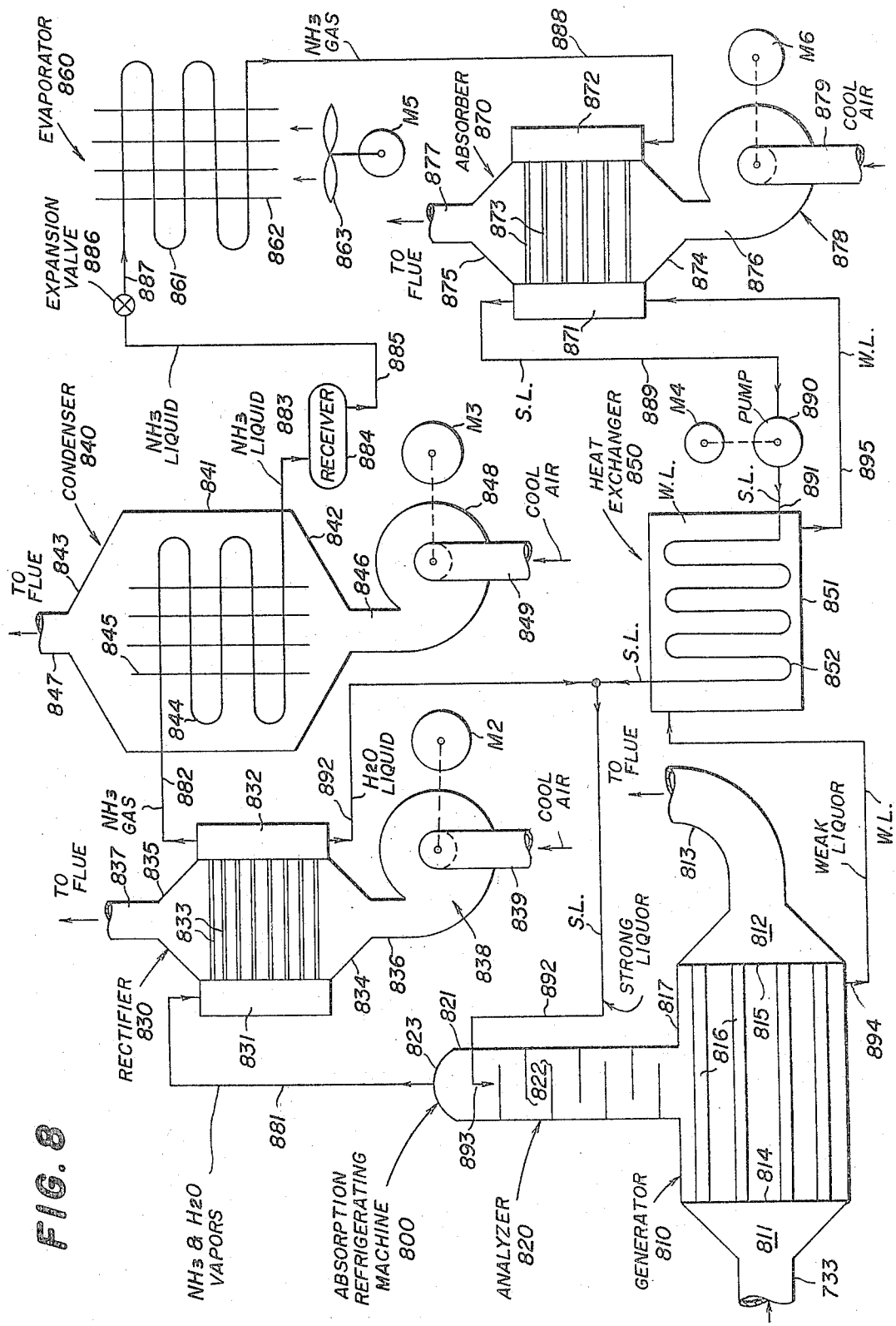

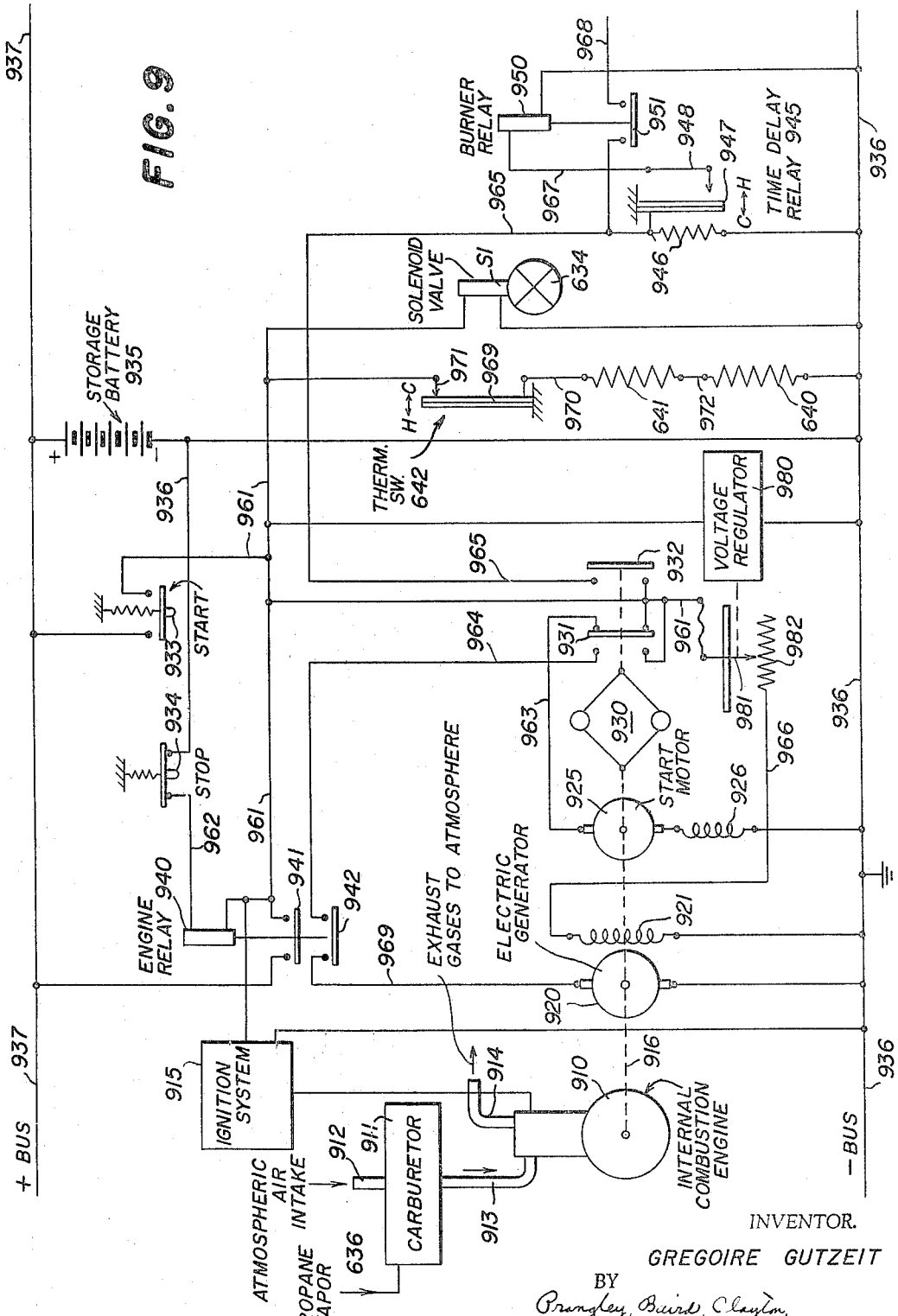

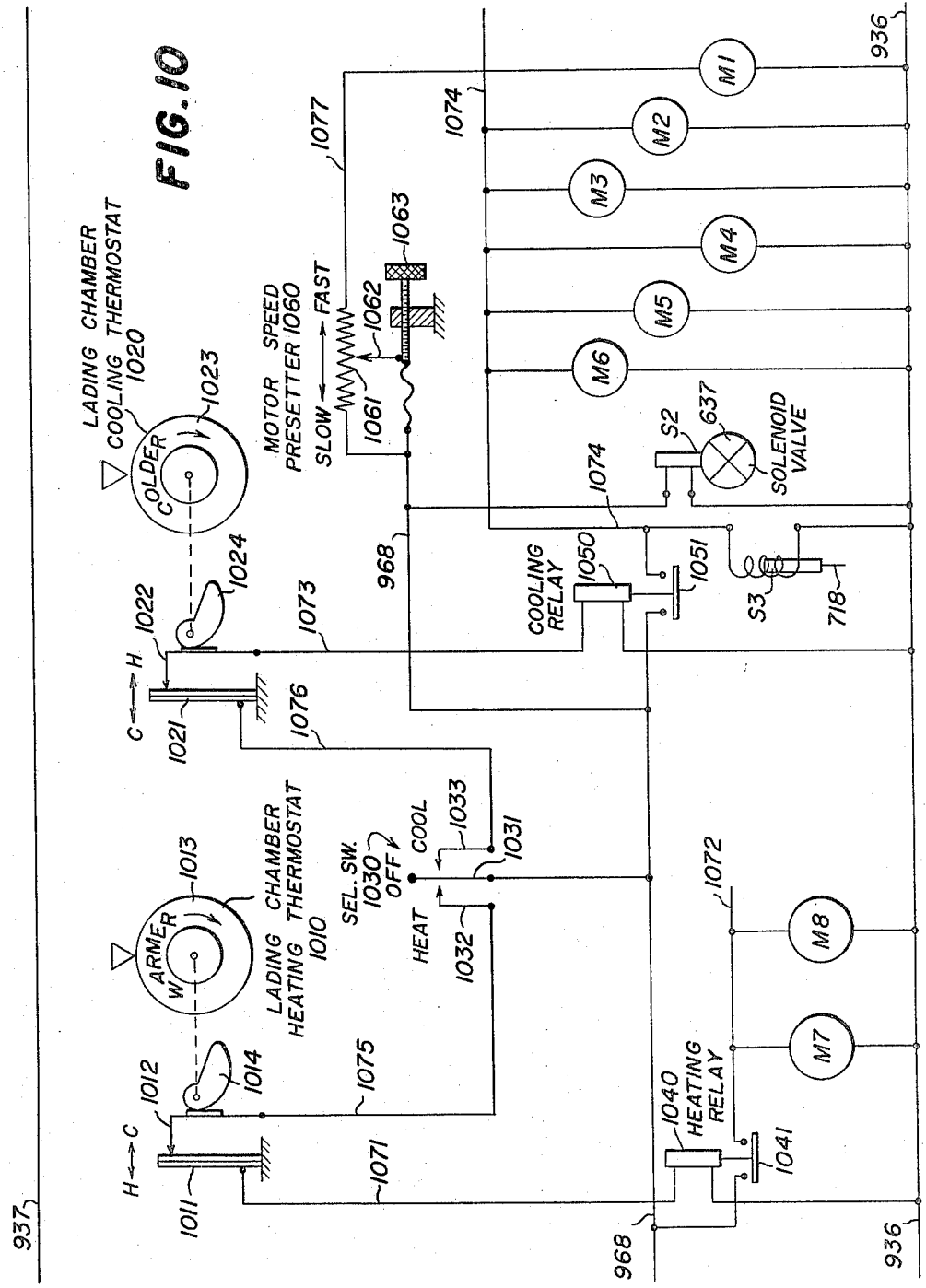

United States Patent Office 3,291,199
Patented Dec. 13, 1966

3,291,199
COMBINATION HEATING AND COOLING SYSTEM INCORPORATING A FLAMELESS COMBUSTION HEATER OF THE CATALYTIC TYPE
Gregoire Gutzeit, Highland, Ind., assignor to General American Transportation Corporation, Chicago, Ill., a corporation of New York
Filed Sept. 25, 1963, Ser. No. 311,457
13 Claims. (Cl. 165—27)

The present invention relates to a combination heating and cooling system incorporating a flameless combustion heater of the catalytic type, a space heater, an absorption refrigerating machine of the evaporator-absorber-generator-condenser type and facility for selectively associating the flameless combustion heater with the space heater to effect heating by the space heater and with the generator to effect cooling by the evaporator.

In piggyback transportation systems, a container is provided that may be mounted upon a road bogie to produce a composite road semi-trailer that may be connected to a road tractor for highway use, and that may be mounted upon a railway flat car for railway use; whereby the container constitutes the body of a road vehicle in the one case and the body of a railway vehicle in the other case; and the container comprises structure accommodating the ready transfer thereof between the two types of service mentioned. The container comprises heat-insulating structure defining a lading chamber therein and other structure cooperating with the heat-insulating structure to define a machinery compartment and a fuel compartment both disposed exteriorly of the lading chamber and at the front end of the container.

Most of these containers have only cooling facility; whereby a refrigerating machine is provided of the compressor-condenser-evaporator type, the evaporator being arranged in the lading chamber, and the compressor and the condenser being arranged in the machinery compartment. An internal combustion engine is arranged in the machinery compartment and operatively connected to the compressor; and the engine is operated by propane contained in storage tanks arranged in the fuel compartment.

A few of these containers also comprise heating facility, in addition to the above described cooling facility; whereby in this case, a propane heater of the open-flame type is also arranged in the machinery compartment, and heat developed by the heater is suitably pumped into the lading chamber.

As noted above, most of these containers have no heating facility for the simple reason that such propane heaters of the open-flame type are dangerous in operation, since they are subject to explosion and like fire hazards; whereby many of the railroad companies will not permit operation of such propane heaters, while the container is mounted upon the railway flat car in piggyback service. Also, many state highway authorities will not permit operation of such propane heaters on stretches of highway involving tunnels or other special structures, because of the fire hazard mentioned.

Accordingly, it is a general object of the invention to provide in a vehicle body, such as the body of a highway semi-trailer or the body of a railway car, an improved heating system involving a flameless combustion heater of the catalytic type as the fundamental source of heat therein.

Another object of the invention is to provide in a vehicle body, such as the body of a highway semi-trailer or the body of a railway car, an improved cooling system of the absorption refrigerating machine type involving a flameless combustion heater of the catalytic type as the fundamental source of heat for the generator of the absorption refrigerating machine.

Another object of the invention is to provide in a vehicle body, such as the body of a highway semi-trailer or the body of a railway car, an improved combination heating and cooling system that is operated fundamentally by a flameless combustion heater of the catalytic type.

Another object of the invention is to provide a container that is adapted to serve either as the body of a highway semi-trailer or as the body of a railway flatcar, and that comprises an improved combination heating and cooling system of the character described.

A further object of the invention is to provide a heating system of general utility and incorporating an improved arrangement of a flameless combustion heater of the catalytic type.

A further object of the invention is to provide a cooling system of general utility and of the absorption refrigerating machine type and incorporating an improved arrangement of a flameless combustion heater of the catalytic type.

A further object of the invention is to provide a combination heating and cooling system of general utility and of the type described and incorporating an improved arrangement of a flameless combustion heater of the catalytic type.

A further object of the invention is to provide in a combination heating and cooling system, a flameless combustion heater of the catalytic type as the principal driver for the system either in its heating cycle or in its cooling cycle, and an internal combustion engine for driving the auxiliaries associated with the system.

A further object of the invention is to provide in a combination heating and cooling system of the character described, an improved control arrangement and network for governing the operation of the engine and for coordinating the operation of either the heating apparatus or the cooling apparatus as desired.

Further features of the invention pertain to the particular arrangement of the elements of the combination heating and cooling system and of the control network therefor, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view of a container mounted upon a road bogie and the rear end of a road tractor and constituting a road semi-trailer, and incorporating a combination heating and cooling system embodying the present invention;

FIG. 2 is a side elevational view of two of the containers mounted upon a railway flat car and constituting the body of the railway car, and each incorporating a combination heating and cooling system of the character noted;

FIG. 3 is an enlarged horizontal sectional view of the container, this view being taken in the direction of the arrows along the line 3—3 in FIG. 1;

FIG. 4 is an enlarged and elevational view of the front end of the container, as shown in FIG. 1;

FIG. 5 is an enlarged end elevational view of the rear end of the container, as shown in FIG. 1;

FIG. 6 is a diagrammatic illustration of a flameless combustion heater of the catalytic type that is incorporated in the combination heating and cooling system;

FIGS. 7 and 8, taken together, comprise a diagrammatic illustration of a heating unit and an absorption refrigerating machine that are incorporated in the combination heating and cooling system; and FIGS. 9 and 10, taken together, are a diagrammatic illustration of an electric control system and circuit network for the elements incorporated in the combination heating and cooling system, as shown in FIGS. 6 to 8, inclusive.

Referring now to FIG. 1 of the drawings, there is illustrated a freight transportation system comprising a container 20, a road bogie 40 supporting the rear end of the container 20, a road tractor 50 carrying a fifth-wheel mechanism 51 at the rear end thereof and supporting the front end of the container 20. Thus, the container 20 and the road bogie 40 comprise a road semi-trailer adapted for highway travel, the container 20 including a rigid base 21 carrying a body 22, and the front end of the base 21 carrying a depending centrally disposed kingpin 23 that may be selectively held and released by the fifth-wheel mechanism 51 in a conventional manner.

Referring to FIG. 2, there is illustrated a modified form of the freight transportation system comprising two of the containers 20, and a railway car 60 supporting the two containers 20 on the opposite ends thereof. Preferably, the railway car 60 is of the construction and arrangement of that disclosed in the copending application of Deodat Clejan, Serial No. 226,429, filed September 26, 1962, now Patent No. 3,168,876, granted February 9, 1965; which railway car 60 is of skeleton-like construction comprising an elongated longitudinally extending center sill 61 of fishbelly configuration supported adjacent to the opposite ends thereof by a pair of trucks 62 provided with flanged wheels 63 supported by a cooperating railway track 64. The center sill 61 is of narrow width lying entirely within the planes of the wheels 63 of the trucks 62. Each of the containers 20 is mounted upon the adjacent end of the center sill 61 by an arrangement including a front bolster 71 and a rear bolster 72; which bolsters 71 and 72 are preferably of the construction and arrangement of those disclosed in the copending application of Robert L. Hassenauer and Samuel H. Enochian, Serial No. 209,946, filed July 16, 1962, now abandoned. It will be understood that each of the containers 20 may be transferred onto and off of the center sill 61 of the railway car 60 in any suitable manner, such, for example, as by the use of a gantry crane. Of course, the road bogie 40 may be readily connected and disconnected with respect to the rear end of the container 20 employing rails 24 provided at the rear end of the base 21 thereof, all in a conventional manner.

Preferably, the container 20 is of the construction and arrangement of that disclosed in the copending application of Ernest Freudman, Serial No. 215,095, filed August 6, 1962, now Patent No. 3,133,658, granted May 19, 1964; whereby the container 20 is of unitary strong rigid construction, including a plurality of individual panels of sandwhich structure. Specifically, as shown in FIGS. 1 to 5, inclusive, the body 22 is of elongated box-like form, including a floor panel 26, a roof panel 27, a pair of front side wall panels 28, a pair of rear side wall panels 29 and a front partition panel 30, all formed of the previously mentioned sandwhich structure and of heat-insulating character to define a lading chamber 31 therein. Also, the body 22 includes two pairs of side doors 32, and a pair of rear doors 33, all of the individual doors 32 and 33 being hinged to swing outwardly, as indicated by the associated arcs in FIG. 3. Also, the body 22 comprises a front panel 34 and a pair of side partition panels 35, all of the heat-insulating sandwhich structure mentioned, and cooperating to define a heat-exchange compartment 36 disposed in the central portion of the front end of the container 20; which compartment 36 communicates directly with the adjacent front end of the lading chamber 31 via upper and lower openings 30a provided in the front partition panel 30. Further, the body 22 comprises other structure 34a cooperating with the adjacent portions of the panels 30 and 35 to define a machinery compartment 37 in one adjacent front corner of the container 20 and disposed exteriorly of both the lading chamber 31 and the heat-exchange compartment 36. Similarly, the body 22 comprises other structure 34b cooperating with the adjacent portions of the panels 30 and 35 to define a fuel compartment 38 in the other adjacent front corner of the container 20 and disposed exteriorly of both the lading chamber 31 and the heat-exchange compartment 36. Finally, a control compartment 39 is formed in the lower front portion of the heat-exchange compartment 36. The constructional details of the container 20 are not set forth with particularity herein, since the same form no part of the present invention.

Referring now to FIGS. 6 to 8, inclusive, the combination heating and cooling system there illustrated, and embodying the features of the present invention, essentially comprises a flameless combustion heater 600, a heating unit 700 and an absorption refrigerating machine 800.

The flameless combustion heater 600 is of the catalytic type and comprises, as shown in FIG. 6 an upstanding substantially cylindrical tube 601, the upper end of which is in open communication with the atmosphere and constitutes an adit for atmospheric air, and the lower end of which flares outwardly to join the upper end of an adjacent enlarged upstanding substantially cylindrical tube 602. The lower end of the tube 602 joins the upper end of an adjacent upstanding downwardly converging funnel 603, the lower end of which is open and constitutes an exit for the air. An upstanding substantially cylindrical tube 604 is arranged below and in alignment with the funnel 603; and the upper end of the tube 604 carries therein an upstanding downwardly converging funnel 605. The funnel 603 is arranged in spaced relation immediately above the funnel 605 and in alignment therewith, so that the bottom opening from the funnel 603 directs the air stream into the bottom opening in the funnel 605, and so that a narrow annular throat or space 606 is defined between the funnels 603 and 605 and communicating between the exterior of the funnels 603 and 605 and the interior of the tube 604. Further, the upper portion of the funnel 603 and the upper portion of the tube 604 are joined together by an upstanding substantially drum-like casing 607 defining an annular chamber 608 surrounding the other annular portion of the throat 606. The structure 603, 605, 607 defines an aspirator, denoted as 609; whereby it will be understood that when a stream of air is directed from the tube 602 through the funnels 603 and 605 into the tube 604 the high velocity of the air passing through the openings in the funnels 603 and 605 creates a low pressure or venturi effect in the inner annular portion of the throat 606, with the result that vapor present in the chamber 608, is drawn therefrom through the throat 606 and into the air stream passing through the openings in the funnels 603 and 605 and is thus projected therewith into the upper end of the tube 604. At this point, it is noted that propane vapor is supplied via a pipe 610 into the chamber 608; whereby the aspirator 609 effects the injection of this vapor into the previously noted air stream, so as to produce a gaseous mixture of propane vapor and air passing through the tube 604, this gaseous mixture constituting a combustible mixture of the combustible substance, propane, and air, and employed for a purpose explained below.

The lower end of the tube 604 is connected by a downwardly flared and diverging annular wall 611 to the upper end of an enlarged upstanding substantially cylindrical wall 612; and the lower end of the wall 612 is connected by a downwardly flared and converging annular wall 613 to the upper end of an aligned upstanding tube 614. Also, the heater 600 comprises a blower 615 provided with a casing having an inlet connected to the lower end of the tube 614 and an outlet connected to a conduit 616. The casing of the blower 615 houses rotor structure, not shown, that is driven by an associated electric motor M1.

Arranged within the cylindrical wall 612 are upper and lower foraminous screens 617 and 618 defining an annular space therebetween and containing a corresponding annular porous bed 619 of catalytic material that is characterized by the production of flameless catalytic combustion of the combustible mixture in passing therethrough with the consequent production of hot flue gases passing from the bed 619 via the tube 614 and thence into the casing of the blower 615 and ultimately through the conduit 616. Also, annular structure 620 is arranged in surrounding relation with the annular wall 613 and connected thereto and cooperating therewith to define an annular chamber 621 therebetween; which structural arrangement constitutes a preheater, denoted at 622.

Further, the heater 600 comprises a fuel tank 630 that is adapted to contain a body of volatile liquid fuel (i.e. readily vaporized at a relatively low temperature), such as propane. The tank 630 comprises a valve-controlled charging inlet 631 and a valve-controlled supply outlet 632. In turn, the supply outlet 632 is connected via a pipe 633 to a solenoid valve 634; and the valve 634 is connected via a pipe 635 to the preheater 622. The preheater 622 is also connected to a pipe 636; and a solenoid valve 637 interconnects the pipes 636 and 610. Further, an electric heating unit 640 is embedded in the central portion of the catalytic bed 640 in good heat-exchange relation therewith; an electric heating unit 641 is arranged in good heat-exchange relation with the preheater 622; and a thermal switch 642 is arranged in good heat-exchange relation with the tube 614. The thermal switch 642 occupies its closed position when the tube 614 is cold; and a circuit is provided for energizing the electric heating units 640 and 641 in series relation with each other and via the thermal switch 642.

Considering now the overall operation of the flameless combustion heater 600, it is first assumed that the catalytic bed 619 is hot, that the solenoids S1 and S2 of the respective valves 634 and 637 are energized to open the valves, that the motor M1 is operating, and that the thermal switch 641 has responded to a hot condition of the tube 614 to deenergize the electric heating units 640 and 641. Liquid propane is supplied from the tank 630 via the elements 632, 633, 634 and 635 into the hot preheater 622, so that it is flashed to vapor; whereby the propane vapor is supplied from the preheater 622 via the elements 636, 637 and 610 to the aspirator 609, so that it fills the chamber 608 communicating with the throat 606. Operation of the blower 615 effects the drawing of atmospheric air into the open upper end of the tube 601 and flow of the air stream through the elements 601, 602, 603 and 605 into the tube 604. The high velocity of the air stream through the openings in the funnels 603 and 605 creates a low pressure area in the inner portion of the throat 606, with the result that the propane vapor in the chamber 608 of the aspirator 609 flows therefrom through the throat 606 and into the air stream passing through the openings in the funnels 603 and 605; whereby a combustible mixture of the propane vapor and the air is produced and projected in a stream through the tube 604 and then passes into the porous catalytic bed 619. In passing through the porous catalytic bed 619, the mixture undergoes flameless catalytic combustion, as distinguished from open-flame burning, with the consequent production of heat and flue gases consisting essentially of carbon dioxide and water vapor. The catalytic bed 619 is thus maintained in a hot condition, and the hot flue gases are drawn through the tube 614 into the blower 615. In the blower 615 the hot flue gases undergo compression and are forced or blown through the conduit 616.

In order to initiate operation of the catalytic action of the catalytic bed 619, it is necessary to preheat the same; and when it is cold or under temperature, this is accomplished by completing the electric circuit for energizing the electric heating unit 640 (as well as the heating unit 641) via the thermal switch 642 in its closed position. The electric heating unit 640 develops a "hot spot" in the catalytic bed 619, whereby the catalytic action described above takes place thereat when the combustible mixture is passed through the catalytic bed 619; whereby this local catalytic action heats the adjacent portions of the catalytic bed 619, with the result that the catalytic action rapidly grows in the catalytic bed 619 soon producing complete catalytic action uniformly throughout the catalytic bed 619, the hot flue gases produced cause heating of the tube 614, whereby the thermal switch 642 responds to effect interruption of the electric circuit for energizing the electric heating unit 640. Of course, the continued operation of the flameless combustion heater 600 maintains the catalytic bed 619 thereof in a hot catalytically active condition in an obvious manner.

Simultaneously, with initiation of operation of the catalytic action of the catalytic bed 619, as described above, operation of the preheater 622 is initiated, since the series circuit for energizing the electric heating units 640 and 641 is completed and subsequently interrupted by the thermal switch 642. Thus, the preheater 622 is heated by the heating unit 641 to initiate operation thereof simultaneously with the heating of the catalytic bed 619 by the heating unit 640.

In the construction of the flameless combustion heater 600, it is particularly advantageous to form the foraminous screens 617 and 618 and the tube 612 that contact the catalytic bed 619, of stainless steel; likewise, if costs permit, the elements 601, 602, 603, 604, 605, 607, 611, 613, 620 and 614 may also be formed of stainless steel.

The construction and arrangement of the flameless combustion heater 600 is disclosed and claimed in the copending divisional application of Gregoire Gutzeit, Serial No. 432,179, filed February 12, 1965.

Considering now in some detail the catalytic bed 619, the same may comprise a number of available materials, such for example as the catalyst described in British Patent No. 862,771, published March 15, 1961, granted to Johann H. Helberger, and consisting essentially of the chromium (IV and V) oxides, the black oxides as distinguished from the chrome green oxide $Cr_2O_3$. While the Helberger catalyst is entirely suitable for the present purpose, the same has the undesirable operating characteristic that these higher chromium oxides decompose at 400° C., to the chrome green oxide $Cr_2O_3$; whereby the catalytic action is so greatly reduced that it is not possible further to effect flameless catalytic combustion of the propane-air mixture in the catalytic bed. Also, the threshold temperature to initiate such flameless catalytic combustion of this mixture is in the general temperature range 200° C. to 230° C.; whereby the operating temperature range of the catalytic bed must be confined to the range from about 250° C. to about 350° C.

Accordingly, the improved catalytic elements disclosed and claimed in the copending application of Pranas Budininkas, Serial No. 307,805, filed September 10, 1963, are especially recommended for use in the catalytic bed 619 of the flameless combustion heater 600, since the Budininkas catalytic elements do not undergo decomposition until the temperature of 650° C. is reached; whereby the operating temperature range of the catalytic bed may embrace the broad range from about 250° C. to about 600° C., thereby lending great stability and latitude in the operation of the catalytic bed 619 in the flameless combustion heater 600.

More particularly, a preferred example of the Budininkas catalytic element comprises a porous structure having an effective surface of large area, the structure consisting essentially of a bead, or a short rod, of activated alumina, and a catalyst supported in a thin layer by the effective surface of the structure and having a corresponding surface of large area, the catalyst consisting essentially of chromium (IV and V) oxides and being substantially free of chromium (III and VI) oxides and being characterized in the supported condition by chemical stability at temperatures up to 600° C. (actually up to about 650° C.).

Such preferred example of the Budininkas catalytic element may be manufactured, in accordance with the preferred Budininkas method, by soaking the porous structure described in an aqueous solution, containing about 43% to 50% $CrO_3$ by weight, followed by draining of excess of the solution from the structure, and then by heating he soaked structure at a temperature of about 600° C., during a time interval of at least about 2 hours.

Of course, a catalytic bed of the Budininkas catalytic elements is not only porous in the general sense that the mixture may readily penetrate the bed bed via the interstices therein, but the individual catalytic elements are also porous to the passage of the mixture therethrough.

In the operation of the flameless combustion heater 600, it is advantageous to supply air in the amount of at least 1.8 times the stoichiometric amount to effect complete or total combustion of the propane vapor; which ratio of propane vapor to air in the mixture passing into the tube 604 is maintained substantially constant by virtue of the automatic action or operation of the aspirator 609. Thus, in the event of an increase in the rate of flow of the air into the tube 601, there is an increase in the velocity of the air through the openings in the funnels 603 and 605, whereby a lower pressure appears in the inner portion of the throat 606, so as to increase the rate of flow of the propane vapor through the throat 606, so as to maintain substantially constant the ratio between the volume of propane vapor and the volume of air in the mixture passing through the tube 604. Also, as the volume of the mixture passing through the tube 604 is thus increased, the temperature of the catalytic bed 619 is correspondingly increased within the operating temperature range thereof and the volume of the flue gases is correspondingly increased. The increased volume of the flue gases in the tube 614 increases the load in the blower 615, whereby its drive motor M1 tends to slow down, with the result that the pressure differential across the catalytic bed 619 is reduced, causing an increased pressure in the tube 604, so as to reduce the rate of flow of the air into the tube 601. Thus, the actions of the aspirator 609, the catalytic bed 619 and the blower 615 coact to produce a substantially constant temperature of the catalytic bed 619, within its operating temperature range, and to produce a substantially constant volume of the hot flue gases passing through the conduit 616. Thus, the rating or heating capacity of the flameless combustion heater 600 in B.t.u./hour is substantially constant.

In order to vary the heating capacity of the flameless combustion heater 600, it is only necessary to vary the gas-handling capacity of the blower 615; which may be effected in a ready manner by correspondingly varying the speed of the drive motor M1. Specifically, an increase in the speed of the drive motor M1 causes the blower 615 to increase the differential pressure across the catalytic bed 619, which results in a high operating temperature thereof, and the consequent production of flue gases at a higher rate; whereby the production rate of flue gases is increased and the temperature thereof is increased, so as to increase in an obvious manner the B.t.u./hour that are delivered from the flameless combustion heater 600 into the conduit 616.

The heating unit 700 comprises, as shown in FIG. 7, a control valve 710 including a casing providing an inlet 711 and two outlets 712 and 713, as well as a gate 714 pivoted at 715 and movable between a position closing the outlet 712 and a position closing the outlet 713. The inlet 711 is connected to the conduit 616 extending from the flameless combustion heater 600, and the outlets 712 and 713 are respectively connected to two conduits 732 and 733. The gate 714 is normally biased into its position closing the outlet 713 by a coil spring 716 connected between a base plate 717 and an operating rod 718 that is pivotally connected to the gate 714, as indicated at 719. The upper end of the rod 718 carries an armature 720 that is operatively associated with a solenoid S3. When the solenoid S3 is energized, the rod 718 is raised against the bias of the coil spring 716 to cause the gate to open the outlet 713 and to at least partially close the outlet 712. More particularly, the lower end of the rod 718 carries a stop 721 that cooperates with a stop 722 carried by the upper end of a threaded member 723 arranged in a threaded opening provided in the base plate 717; and the lower end of the member 723 carries a knurled handwheel 724. Thus, selective rotation of the handwheel 724 effects corresponding vertical movement of the member 723 and the consequent vertical adjustment of the stop 722 with respect to the stop 721, thereby to vary the upward movement of the gate 714 toward full closure of the outlet 712 in response to energization of the solenoid S3 which may be adjusted in an obvious manner.

Also, the heating unit 700 comprises a heat exchanger 740 of the fire-tube type, including an inlet header 741 connected to the upper end of the conduit 732 and an outlet header 742 connected to a flue 743 communicating with the atmosphere. The heat-exchanger 740 further includes lower and upper header plates 744 and 745 terminating the opposite ends of the tubes 746, as well as an enclosing jacket 747. Also, a space heater 750 of the liquid-tube type is provided that includes lower and upper headers 751 and 752 and a number of connecting tubes 753. Also, a fan 754, driven by an electric motor M8, is arranged to circulate air to be heated through the tubes 753 and into good heat-exchange relation therewith.

The lower portion of the jacket 747 is connected to a pipe 761 that extends to the inlet of a fluid pump 762; and the outlet of the pump 762 is connected to a pipe 763 that extends to the lower heater 751. The upper header 752 is connected to a pipe 764 that extends to the inlet of a check valve 765; and the outlet of the check valve 765 is connected to a pipe 766 that extends to the upper portion of the jacket 747. The pump 762 is driven by an electric drive motor M7. The jacket 747 and the space heater 750 contain a quantity of a suitable fluid, such, for example, as chlorinated diphenyl; which fluid is stable as a liquid at very high temperatures, at least as as high as 600° F., and is productive of low vapor pressure at these high temperatures.

Considering now the operation of the heating unit 700, the solenoid S3 is deenergized so that the gate 714 closes the outlet 713 and opens the outlet 712; whereby the hot flue gases passing through the conduit 616 are directed by the valve 710 through the conduit 732 and pass through the heat exchanger 740 and thence via the flue 743 to the atmosphere. The motor M7 is operated to drive the pump 762; whereby the fluid contained in the jacket 747 is circulated via the elements 761, 762 and 763 from the lower portion of the jacket 747 into the lower header 751. The hot fluid passes from the lower header 751 via the tubes 753 into the upper header 752 and is then returned via the elements 764, 765 and 766 back into the upper portion of the jacket 747. The motor M8 is operated; whereby the fan 754 circulates the air to be heated through the space heater 750 and into good heat-exchange relation therewith to effect heating thereof in an obvious manner.

In order to arrest operation of the heating unit 700, operation of the motors M7 and M8 are arrested; whereby the heat in the heat exchanger 740 is not transferred to the space heater 750, since the pump 762 is not operated; and, of course, the fan 754 is not operated to circulate the air through the space heater 750. Thus, even though hot flue gases may be passing through the heat exchanger 740 at this time, there is no effective transfer of heat from the heat exchanger 740 to the space heater 750. In order further to insure this result, the check valve 765 closes, when operation of the pump is arrested.

Thus, at this time, the pump 762 blocks flow of fluid from the pipe 761 into the pipe 763, and the check valve 765 blocks flow of fluid from the pipe 766 into the pipe 764.

The absorption refrigerating machine 800 comprises, as shown in FIG. 8, a generator 810 of the fire-tube type, a connected analyzer 820, a rectifier 830 of the liquid-tube type, a condenser 840, a heat exchanger 850, an evaporator 860 and an absorber 870 of the liquid-tube type. It may also be assumed that the machine 800 operates on an ammonia-water basis; whereby a strong solution of $NH_3$ in water is referred to as a "strong liquor" and a weak solution of $NH_3$ in water is referred to as a "weak liquor."

The generator 810 comprises an inlet header 811 connected to the extremity of the conduit 733 extending to the outlet 713 of the control valve 710, and an outlet header 812 connected to a flue 813 communicating with the atmosphere. Also, the generator 810 includes two spaced-apart header plates 814 and 815 terminating the opposite ends of the tubes 816, as well as an enclosing jacket 817. The generator 810 is arranged in a generally horizontal position; and the analyzer 820 is arranged in a generally vertical position. The analyzer 820 comprises an upstanding casing 821 opening at the bottom end thereof into the top of the jacket 817 of the generator 810 and housing the usual tier of vertically spaced-apart and horizontally disposed riffle plates 822. The top of the casing 821 terminates in a collection dome 823.

The rectifier 830 comprises two spaced-apart fluid headers 831 and 832 connected together by the tubes 833, and an enclosing casing provided with inlet and outlet air headers 834 and 835. The inlet air header 834 is connected to a conduit 836, and the outlet air header 835 is is connected to a flue 837 communicating with the atmosphere. A blower 838 is associated with the rectifier 830 and operated by a drive motor M2. The blower 838 includes an inlet connected to a conduit 839 and an outlet connected to the conduit 836; and the outer end of the conduit 839 communicates with the atmosphere.

The condenser 840 comprises a casing 841 having an inlet connection 842 and an outlet connection 843 and enclosing a sinuous coil 844 carrying finned structure 845. The inlet connection 842 terminates a conduit 846, and the outlet connection terminates a flue 847 communicating with the atmosphere. A blower 848 is associated with the condenser 840 and operated by a drive motor M3. The blower 848 includes an inlet connected to a conduit 849 and an outlet connected to the conduit 846; and the outer end of the conduit 849 communicates with the atmosphere.

The heat exchanger 850 comprises a casing 851 enclosing a sinuous coil 852.

The evaporator 860 comprises a sinuous coil 861 carrying finned structure 862; and a fan 863 is arranged to circulate air to be cooled over the coil 861 and through the finned structure 762, the fan 863 being driven by an electric motor M5.

The absorber 870 comprises two spaced-apart fluid headers 871 and 872 connected together by the tubes 873, and an enclosing casing provided with inlet and outlet air headers 875 and 876. The inlet air headers 874 is connected to a conduit 876, and the outlet air header 875 is connected to a flue 877 communicating with the atmosphere. A blower 878 is associated with the absorber 870 and operated by a drive motor M6. The blower 878 includes an inlet connected to a conduit 879 and an outlet connected to the conduit 876; and the outer end of the conduit 879 communicates with the atmosphere.

In the absorption refrigerating machine 800: the analyzer dome 823 is connected by a pipe 881 to the top of the rectifier header 831; the top of the rectifier header 832 is connected by a pipe 882 to the inlet of the condenser coil 844; the outlet of the condenser coil 844 is connected by a pipe 833 to the top of a receiver 884; the bottom of the receiver 884 is connected by a pipe 885 to the inlet of an expansion valve 886; the outlet of the expansion valve 886 is connected by a pipe 887 to the inlet of the evaporator coil 861; the outlet of the evaporator coil 861 is connected by a pipe 888 to the bottom of the absorber header 872; the top of the absorber header 871 is connected by a pipe 889 to the inlet of a pump 890; the outlet of the pump 890 is connected by a pipe 891 to the inlet of the heat exchanger coil 852; and the outlet of the heat exchanger coil 852 is connected to a pipe 892. The bottom of the rectifier header 832 is also connected to the pipe 892; and the pipe 892 terminates in a spray nozzle 893 arranged in the upper portion of the analyzer casing 821. The bottom of the generator jacket 817 is connected by a pipe 894 to the top of the heat exchanger casing 851; and the bottom of the heat exchanger casing 851 is connected by a pipe 895 to the bottom of the absorber header 871. The pump 890 is driven by an electric drive motor M4.

Considering now the operation of the absorption refrigerating machine 800, it may be assumed that the gate 714 of the control valve 710 occupies its position opening the outlet 713 so that the hot flue gases entering the control valve 710 passes through the conduit 733 and thence through the tubes 816 in the generator 810 and via the flue 813 to the atmosphere; whereby the strong liquor contained in the generator jacket 817 is heated. In this connection, it is mentioned that the flameless combustion heater 600 is capable of developing heat at a rate that is somewhat higher than that required by the operation of the generator 810 in the absorption refrigerating machine 800; whereby the stop 722 may be adjusted at the knob 724 to engage the stop 721 carried by the rod 718 so as to prevent complete closure by the gate 714 of the valve outlet 712; whereby the hot flue gases passing into the valve inlet 711 are divided by the gate 714 between the two valve outlets 712 and 713, when the solenoid S3 is energized to operate the rod 718 against the bias of the coil spring 716 and to cause the gate 714 to open the valve outlet 713. Heating of the strong liquor contained in the generator jacket 817 causes the liberation of $NH_3$ vapor and some water vapor that pass into the bottom of the analyzer 820 and the consequent production of hot weak liquor in the generator 810. The motor M4 is operated to effect operation of the pump 890, whereby strong liquor from the absorber header 871 is pumped via the elements 889, 890, 891, 852 and 892 to the nozzle 893 in the upper portion of the analyzer 820. In the heat exchange coil 852, the strong liquor is heated so as to reduce the capacity of the water therein to absorb $NH_3$ gas; whereby the warm strong liquor is sprayed downwardly from the nozzle 893 in the upper portion of the analyzer 820 and then cascades from one to the other of the riffle plates 822 downwardly in curtains through the analyzer 820 and ultimately into the top of the generator jacket 817. As the hot $NH_3$ vapor and the hot water vapor from the generator 810 passes upwardly through the analyzer 820, the same must penetrate the several curtains of cascading strong liquor moving downwardly in the analyzer; whereby this washing of the hot water vapor condenses a substantial proportion thereof, without substantial absorption of the hot $NH_3$ vapor by the warm strong liquor. Thus, a minimum amount of water vapor is mixed with the $NH_3$ vapor in the analyzer dome 823; which mixture passes via the pipe 881 into the rectifier header 831.

The hot weak liquor is pumped from the generator jacket 817 via the pipe 894 through the heat exchanger casing 851 for the purpose of heating the strong liquor passing through the heat exchanger coil 852. From the heat exchanger casing 851, the weak liquor is pumped via the pipe 895 into the bottom of the absorber header 871.

The warm $NH_3$ vapor and water vapor mixture passing into the rectifier header 831 passes through the tubes 833 into the rectifier header 832. The motor M2 is operated to effect operation of the blower 838; whereby the tubes 833 are cooled so as to condense the water vapor from the mixture mentioned as it passes through the tubes 833; whereby the condensate accumulates in the bottom of the rectifier header 832 and is drained therefrom via the pipe 892 into the strong liquor passing therethrough and into the nozzle 893 arranged in the upper portion of the analyzer 820. The NH$_3$ gas accumulates in the top of the rectifier header 832 and is conducted therefrom via the pipe 882 into the condenser coil 844. The motor M3 is operated to effect operation of the blower 848; whereby the condenser coil 844 and the finned structure 845 are cooled to cause condensation of the NH$_3$ in the condenser coil 844; whereby the condensed NH$_3$ or liquid NH$_3$ flows from the condenser coil 844 via the pipe 883 into the receiver 884.

From the receiver 884, the liquid NH$_3$ flows via the pipe 885 to the expansion valve 886, wherein it is expanded or flashed into the gas phase and flows via the pipe 887 into the evaporator coil 861 and therethrough and via the pipe 888 into the button of the absorber header 872. Of course, the expansion of the liquid NH$_3$ at the expansion valve 886 and into the gas phase causes cooling thereof and the evaporator coil 861 and the finned structure 862. The motor M5 is operated to effect operation of the fan 863 and the consequent circulation of the air over the evaporator coil 861 and through the finned structure 862 so as to cool the same. In the absorber 870, the NH$_3$ gas supplied via the pipe 888 contacts the weak liquor supplied via the pipe 895; whereby the NH$_3$ gas is absorbed by the weak liquor to produce the strong liquor that is supplied from the absorber header 871 via the pipe 889 to the pump 890, as previously explained. When the weak liquor absorbs the NH$_3$ gas in the absorber 870, the heat of absorption is produced; whereby the strong liquor as produced in the absorber 870 is quite hot. The motor M6 is operated to effect operation of the blower 878; whereby the tubes 873 are cooled to effect cooling of the hot strong liquor in the absorber 870 prior to the supply thereof via the pipe 889 to the pump 890, in the manner previously explained.

Turning now to the control circuit and system for the flameless combustion heater 600, the heating unit 700 and the absorption refrigerating machine 800, and referring to FIGS. 9 and 10, the same comprises an internal combustion engine 910 of any conventional type that is operative upon propane vapor. The engine 910 is provided with a carburetor 911 that is connected to the vapor line 636 extending from the preheater 622 forming a part of the flameless combustion heater 600, as previously described. The carburetor 911 is also provided with a fresh air intake 912 and the resulting mixture is delivered to the cylinders of the engine 910 via a manifold, as indicated at 913. The exhaust gases from the cylinders of the engine pass via an exhaust manifold, indicated at 914, to the atmosphere. Also, the engine 910 comprises a conventional ignition system, indicated at 915, and a drive shaft, indicated at 916. An electric generator, or dynamo, 920 is connected to the drive shaft 916 and provided with a field coil 921; and similarly, an electric start motor 925 is connected to the drive shaft 916 and provided with a field coil 926. Also, a speed responsive device 930 is connected to the drive shaft 916 and provided with two contact bridging members 931 and 932.

Also, the control circuit comprises a manually operable start button 933, a manually operable stop button 934, a storage battery 935 bridged across a grounded — bus 936 and an ungrounded + bus 937, an engine relay 940, a thermal time delay relay 945, and a burner relay 950. The start button 933 controls two contacts respectively terminating the bus 937 and a conductor 961. The stop button 934 controls two contacts respectively terminating a conductor 962 and the bus 936. The contact bridging member 931 controls a pair of back contacts respectively terminating a conductor 963 and the conductor 961. Also, the contact bridging member 931 controls a pair of front contacts respectively terminating a conductor 964 and the conductor 961. The contact bridging member 932 controls a pair of front contacts respectively terminating a conductor 965 and the conductor 961. The armature of the generator 920 is bridged across the bus 936 and a conductor 969; and the field coil of the generator 920 is bridged across the bus 936 and a conductor 966. The armature of the start motor 925 is connected between the conductor 963 and one terminal of the field coil 926 thereof; and the other terminal of the field coil 936 is connected to the bus 936. The supply terminals of the ignition system are respectively connected to the conductor 961 and to the bus 936. The winding of the engine relay 940 is bridged across the conductors 962 and 961; and the engine relay 940 comprises a first contact bridging member 941 controlling a pair of contacts respectively terminating the bus 937 and the conductor 962, and a second contact bridging member 942 controlling a pair of contacts respectively terminating the conductors 969 and 964. The time delay relay 945 comprises a heater 946 bridged across the conductor 965 and the bus 936, a bimetallic member 947 and a switch spring 948. The base of the bimetallic member 947 is connected to the conductor 965; and the base of the switch spring 948 is connected to a conductor 967. The winding of the burner relay 950 is bridged across the conductor 967 and the bus 936; and the burner relay 956 comprises a contact bridging member 951 controlling a pair of contacts respectively terminating the conductor 965 and a conductor 968. The thermal switch 642 includes a metallic member 969 connected to a conductor 970, and a switch spring 971 connected to the conductor 961. The conductor 970 is connected to one terminal of the electric heating unit 641; the other terminal of the unit 641 is connected via a conductor 972 to one terminal of the electric heating unit 640; and the other terminal of the unit 640 is connected to the bus 936. The solenoid S1 of the valve 634 is bridged across the conductor 961 and the bus 936.

Moreover, the control circuit comprises a conventional voltage regulator 980 bridged across the conductor 961 and the bus 936; which regulator 980 adjusts a slide contact 981 connected to the conductor 961 and cooperating with a variable resistor 982 connected to the conductor 966. Further, the control circuit comprises a lading chamber heating thermostat 1010, a lading chamber cooling thermostat 1020, a selector switch 1030, a heating relay 1040, a cooling relay 1050 and a motor speed presetter 1060.

The lading chamber heating thermostat 1010 comprises a bimetallic member 1011, a cooperating switch spring 1012, a manually presettable dial 1013, and a cam 1014 associated with the switch spring 1012 and selectively preset by the dial 1013. Similarly, the lading chamber cooling thermostat 1020 comprises a bimetallic member 1021, a cooperating switch spring 1022, a manually presettable dial 1023, and a cam 1024 associated with the switch spring 1022 and selectively preset by the dial 1023. The motor speed presetter 1060 comprises a variable resistor 1061, an associated adjustable contact 1062 and a manually operable knob 1063 for adjusting the contact 1062. The selector switch 1030 comprises a manually operable master switch spring 1031 and two cooperating switch springs 1032 and 1033; and the master switch spring 1030 has "off" and "heat" and "cool" positions.

The winding of the heating relay 1040 is bridged across a conductor 1071 and the bus 936; and the heating relay 1040 comprises a contact bridging member 1041 controlling a pair of contacts respectively terminating the conductor 968 and a conductor 1072. The winding of the cooling relay 1050 is bridged across a conductor 1073 and the bus 936; and the cooling relay 1050 comprises a contact bridging member 1051 controlling a pair of contacts respectively terminating the conductor 968 and a conductor 1074. In the lading chamber heating thermostat 1010, the elements 1011 and 1012 respectively terminate the conductor 1071 and a conductor 1075; and in the lading chamber cooling thermostat 1020, the elements 1021 and 1022 respectively terminate a conductor 1076 and the conductor 1073. In the selector switch 1030, the elements 1031, 1032 and 1033 are respectively connected to the conductors 968, 1075 and 1076. In the motor speed presetter 1060, the resistor 1061 is bridged across the conductor 968 and a conductor 1077, and the contact 1062 is connected to the conductor 968 and arranged to short-out an adjustable section of the resistor 1061. The motors M7 and M8 are connected in parallel across the conductor 1072 and the bus 936; the motor M1 is connected across the conductor 1077 and the bus 936; and the motors M2, M3, M4, M5 and M6 are connected in parallel across the conductor 1074 and the bus 936. The solenoid S2 of the valve 637 is connected across the conductor 968 and the bus 936.

Considering now the mode of operation of the control circuit to govern the operations of the flameless combustion heater 600, the heating unit 700, the absorption refrigerating machine 800 and the internal combustion engine 910, operation of the engine 910 is started upon momentary operation of the start pushbutton 933. Such operation of the start pushbutton 933 connects the + bus 937 to the conductor 961 so as to complete a circuit including the stop pushbutton 934 for energizing the winding of the engine relay 940 in order to effect operation thereof. Upon operating the engine relay 940 closes the contact bridging member 941 to connect the + bus 937 to the conductor 961 independently of the start pushbutton 933; whereby the engine relay 940 is retained operated upon the release of the start pushbutton 933. The connection of power to the conductor 961 completes a circuit including the contact bridging member 931 and its back contacts, and the conductor 963 for energizing the start motor 925; whereby the drive shaft 916 of the engine 910 is rotated. Also, the ignition system 915 is energized between the conductor 961 and the bus 936. Further, the solenoid S1 is energized across the conductor 961 and the bus 936 to open the valve 634. Also, the electric heating units 640 and 641 are energized in series relation across the conductor 961 and the bus 936 via the thermal switch 642. It may be assumed that the supply valve connection 632 is open; whereby opening of the valve 634 effects the supply of liquid propane from the tank 630 into the preheater 622. Heating of the heating unit 641 causes vaporization of the liquid propane in the preheater 622 and the supply thereof via the vapor line 636 to the carburetor 911; whereby operation of the engine 910 is started. Also, heating of the heating unit 640 effects heating of the adjacent portions of the catalytic bed 619, so as to prepare the same for subsequent operation. The engine 910 quickly brings the drive shaft 916 up to normal speed, so that the speed-responsive device 930 responds to actuate its contact bridging members 931 and 932. The contact bridging member 931 opens its back contacts to interrupt the circuit for energizing the start motor 925, and closes its front contacts to connect the generator 920 across the conductor 961 and the bus 936. Also, the contact bridging member 932 connects the conductor 961 to the conductor 965 for a purpose subsequently explained. At this time the voltage regulator 980 is connected across the conductor 961 and the bus 936; whereby it operates to effect the required adjustment of the contact 981 with respect to the resistor 982 so as to set the circuit, including the resistor 982 for energizing the generator field winding 921 across the conductor 961 and the bus 936, so as to cause the generator 920 to generate a voltage that is slightly higher than that of the storage battery 935; with the result that the storage battery 935 is placed "on-charge" across the buses 936 and 937 in a conventional manner.

Closure of the conductor 961 to the conductor 965 effects energization of the heater 946 of the time delay relay 945; whereby, after a suitable time delay, the bimetallic element 947 is actuated to close the switch spring 948, thereby to connect the conductor 965 to the conductor 967, so as to energize the winding of the burner relay 950 across the conductor 967 and the bus 936. The burner relay 950 operates so that the contact bridging member 951 closes the conductor 965 to the conductor 968. The delay thus interposed by the time delay relay 945 allows the engine 910 a short time interval of operation to reach a steady state condition prior to initiating operation of the flameless combustion heater 600, as explained below. Closure of the conductor 968 completes an obvious circuit for energizing the solenoid S2 so that the valve 637 is opened to connect the vapor line 636 to the pipe 610, thereby to supply vaporized propane from the preheater 622 to the aspirator 609. Also, a circuit is completed for energizing the motor M1 via the resistor 1061 of the motor speed presetter 1060 and across the conductor 968 and the bus 936. Thus, the motor M1 runs at the speed preset by the motor speed presetter 1060; whereby the blower 615 is operated at a corresponding speed, so that the flameless combustion heater 600 is operated to produce heat at a corresponding rate in the manner previously explained.

The position of the selector switch 1030 determines whether the heating unit 700 or the absorption refrigerating machine 800 is to be operated.

It is first assumed that the heating unit 700 is to be operated and that heating is in demand, so that the bimetallic member 1011 is closed to the switch spring 1012 by virtue of the setting of the dial 1013 of the lading chamber heating thermostat 1010. In this case the switch spring 1031 engages the switch spring 1032 by virtue of the manual operation of the selector switch 1030 into its "heat" position; whereby closure of power to the conductor 968 completes a circuit, including the elements 1071, 1011, 1012, 1075, 1032 and 1031, for energizing the winding of the heating relay 1040 across the conductor 968 and the bus 936; with the result that the heating relay 1040 actuates the contact bridging member 1041 to close the conductor 968 to the conductor 1072, so as to operate the motors M7 and M8. The motor M7 operates the pump 762 to circulate the fluid between the heat exchanger 740 and the space heater 750; and the motor M8 operates the fan 754 to circulate the air to be heated over the space heater 750. When the heating demand is satisfied, the bimetallic member 1011 in the lading chamber heating thermostat 1010 disengages the switch spring 1012 to cause restoration of the heating relay 1040; whereby, upon restoring, the heating relay 1040 arrests operation of the motors M7 and M8 to arrest operation of the heating unit 700 in an obvious manner. A subsequent heating demand is evidenced by reclosure of the bimetallic element 1011 of the lading chamber heating thermostat 1010 to the switch spring 1012, whereby the heating relay 1040 is reoperated to effect reoperations of the motors M7 and M8.

It is next assumed that the absorption refrigerating machine 800 is to be operated and that cooling is in demand, so that the bimetallic member 1021 is closed to the switch spring 1022 by virtue of the setting of the dial 1023 of the lading chamber cooling thermostat 1010. In this case the switch spring 1031 engages the switch spring 1033 by virtue of the manual operation of the selector switch 1030 into its "cool" position; whereby closure of power to the conductor 968 completes a circuit, including the elements 1073, 1022, 1021, 1076, 1033 and 1031, for energizing the winding of the cooling relay 1050 across the conductor 968 and the bus 936; with the result that the cooling relay 1050 actuates the contact bridging member 1051 to close the conductor 968, to the conductor 1074, so as to energize the solenoid S3 and to operate the motors M2, M3, M4, M5 and M6. The solenoid S3 actuates the gate 714 of the control valve 710 to open the valve outlet 713, so that the hot flue gases pass through the generator 810 of the absorption refrigeration machine 800 to effect operation thereof in the manner previously explained. The motor M5 operates the fan 863 to circulate the air to be cooled over the evaporator 860; the motors M2, M3 and M6 operate the corresponding blowers 838, 848 and 878; and the motor M4 operates the pump 890; all in the manner previously explained. When the cooling demand is satisfied, the bimetallic member 1021 in the lading chamber cooling thermostat 1020 disengages the switch spring 1022 to cause restoration of the cooling relay 1050; whereby, upon restoring, the cooling relay 1050 arrests operation of the motors M2, M3, M4, M5 and M6 and effect deenergization of the solenoid S3, so as to arrest operation of the absorption refrigerating machine 800 in an obvious manner. A subsequent cooling demand is evidenced by reclosure of the bimetallic element 1021 of the lading chamber cooling thermostat 1020 to the switch spring 1022, whereby the cooling relay 1050 is reoperated to effect reenergization of the solenoid S3 and reoperation of the motors M2, M3, M4, M5 and M6.

Of course it will be understood that when the selector switch 1030 occupies its "off" position, neither the heating unit 700 nor the absorption refrigerating machine 800 is operated.

At any time the operation of the engine 910 and either the heating unit 700 or the absorption refrigerating machine 800, as well as operation of the flameless combustion heater 600, may be arrested by momentary operation of the stop pushbutton 934. Such operation of the stop pushbutton 934 interrupts the circuit for energizing the winding of the engine relay 940, so as to cause it to restore. Upon restoring, the engine relay 940 interrupts at the contact bridging member 941 the connection between the + bus 937 and the conductor 961, and interrupts at the contact bridging member 942 the connection between the conductor 969 and the conductor 961, the conductor 969 extending to one terminal of the generator 920; whereby the conductor 961 is thus isolated from power. This removal of potential from the conductor 961 effects the removal of potential from the conductors 965 and 968, so that potential is removed from the conductor 1072 or 1074. Of course, the solenoid S1 is deenergized to effect the return of the valve 634 into its closed position, and the solenoid S2 is deenergized to effect the return of the valve 637 into its closed position. The ignition system 915 of the engine 910 is interrupted. The burner relay 950 restores; the heating relay 1040, if operated, is restored; the cooling relay 1050, if operated, is restored; and the solenoid S3, if energized, is deenergized to cause the gate 714 in the control valve 710 to be returned to close the outlet 713. All of the motors M1 to M8, inclusive, are stopped; the heating units 640 and 641 are deenergized; and the time delay relay 945 is restored.

Considering now the arrangement of the apparatus in the container 20, it is first noted that all of those elements or components that require manual operation or adjustment are arranged in the control compartment 39 in the front end of the body 22, so that these components are readily accessible from the exterior of the body 22 and may thus be manually operated or adjusted, as required, from the outside of the container 20. Thus, in the control compartment 39 are arranged the elements: 724, 933, 934, 1013, 1023, 1063 and 1030.

The fuel tank 630 is, of course, arranged in the fuel compartment 38. The first group of related elements M8, 754 and 750, and the second group of related elements M5, 863 and 860 are arranged in the heat-exchangement compartment 38.

The remainder of the elements are arranged fundamentally in the machinery compartment 37. Specifically, in the machinery compartment 37 the following groups of elements are arranged: 609, 600, 622, M1 and 615; and 910, 920, 925, 930, 980 and 935; and 710, 740, 762 and M7; and 810, 820, 830, 838, M2, 840, 848, M3, 884, 870, 878, M6, 890, M4 and 850.

Thus, since the entire apparatus is carried by and contained in the container 20, the same may be operated either in its heating operation or in its cooling operation, when the container 20 comprises the body of a road semi-trailer, as shown in FIGURE 1, or when the container 20 comprises the body of a railway car, as shown in FIGURE 2, or even during transfer of the container between the two utilizations described.

Further, it is mentioned that the container 20 may be stored or supported upon a stationary platform, when required; whereby the apparatus carried by and contained in the container 20 may be operated, as previously explained, when the container 20 is thus supported and is not being transported.

In view of the foregoing, it is apparent that there has been provided an improved heating system including a space heater and driven by a flameless catalytic heater, an improved cooling system including an absorption refrigerating machine and driven by a flameless catalytic heater, an improved combination heating and cooling system of the type noted, an improved arrangement of a combination heating and cooling system of the type noted in a freight container especially adapted for use in a piggyback transportation system, and an improved control arrangement and system for a combination heating and cooling system driven by a flameless catalytic heater.

Further, it will be understood that the present system may be employed for the heating purpose, alone or for the cooling purpose alone, as well as for the combination heating-cooling purpose disclosed; and, moreover, the system may be incorporated in other mobile vehicles, such as, railway refrigerator cars, railway freight cars, highway trailers, highway trucks, highway semi-trailers, ships, etc., or in various stationary apparatus, homes, etc.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an absorption refrigerating machine including an evaporator and an absorber and a generator and a condenser connected in a operative circuit, said generator containing a body of strong liquor that consists essentially of a liquid absorbing medium and refrigerant absorbed by the liquid absorbing medium, a tube having an adit and an exit, the adit of said tube communicating with the atmosphere, means for producing flow of an air stream through said tube, an injector operatively associated with an upstream section of said tube and operative to inject into the air stream passing therethrough a combustible substance in order to produce a combustible mixture in the gas phase, a porous catalytic bed arranged in a downstream section of said tube and accommodating the ready passage therethrough of the combustible mixture in the gas phase and characterized by producing flameless catalytic combustion thereof in order to produce hot flue gases, and a conduit having an adit connected to the exit of said tube and an exit communicating with the atmosphere, whereby a stream of the hot flue gases passes through said conduit, said generator being arranged in good heat-exchange relation with said conduit, whereby heating of the strong liquor in said generator effects the liberation of the refrigerant in the vapor phase from the liquid absorbing medium of the strong liquor in a known manner.

2. In an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, a tube having an adit and an exit, the adit of said tube communicating with the atmosphere, a blower having an inlet and an outlet, the exit of said tube being connected to the inlet of said blower, whereby operation of said blower draws an air stream through said tube, an injector operatively associated wtih an upstream section of said tube and operative to inject into the air stream passing therethrough a combustible substance in order to produce a combustible mixture in the gas phase, a porous catalytic bed arranged in a downstream section of said tube and accommodating the ready passage therethrough of the combustible mixture in the gas phase and characterized by producing flameless catalytic combustion thereof in order to produce hot flue gases, a conduit having an adit connected to the outlet of said blower and an exit communicating with the atmosphere, whereby operation of said blower forces a stream of the hot flue gases through said conduit, said generator being arranged in good heat-exchange relation with said conduit, whereby heating of the strong liquor in said generator effects the liberation of the refrigerant in the vapor phase from the liquid absorbing medium of the strong liquor in a known manner, and means for operating said blower.

3. In an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, a tube having an adit and an exit, the adit of said tube communicating with the atmosphere, means for producing flow of an air stream through said tube, an injector operatively associated with an upstream section of said tube and operative to inject into the air stream passing therethrough a combustible substance in order to produce a combustible mixture in the gas phase, a porous catalytic bed arranged in a downstream section of said tube and accommodating the ready passage therethrough of the combustible mixture in the gas phase and characterized by producing flameless catalytic combustion thereof in order to produce hot flue gases, a valve including an inlet and first and second outlets and mechanism for selectively connecting the valve inlet to the first and second valve outlets, the inlet of said valve being connected to the exit of said tube, a first conduit having an adit connected to the first outlet of said valve and an exit communicating with the atmosphere, and a second conduit having an adit connected to the second outlet of said valve and an exit communicating with the atmosphere, whereby a stream of hot flue gases passes into said valve and is then selectively passed through said first and second conduits, said generator being arranged in good heat-exchange relation with said second conduit, whereby heating of the strong liquor in said generator effects the liberation of the refrigerant in the vapor phase from the liquid absorbing medium of the strong liquor in a known manner.

4. In an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, a tube having an adit and an exit, the adit of said tube communicating with the atmosphere, means for producing flow of an air stream through said tube, an aspirator operatively associated with an upstream section of said tube and responsive to the passage of the air stream therethrough to inject into the air stream passing therethrough gaseous fuel in order to produce a combustible mixture in the gas phase, a porous catalytic bed arranged in a downstream section of said tube and accommodating the ready passage therethrough of the combustible mixture in the gas phase and characterized by producing flameless catalytic combustion thereof in order to produce hot flue gases, and a conduit having an adit connected to the exit of said tube and an exit communicating with the atmosphere, whereby a stream of the hot flue gases passes through said conduit, said generator being arranged in good heat-exchange relation with said conduit, whereby heating of the strong liquor in said generator effects the liberation of the refrigerant in the vapor phase from the liquid absorbing medium of the strong liquor in a known manner.

5. In an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, a tube having an adit and an exit, the adit of said tube communicating with the atmosphere, means for producing flow of an air stream through said tube, an aspirator operatively associated with an upstream section of said tube and responsive to the passage of the air stream therethrough to inject into the air stream passing therethrough vaporized liquid fuel in order to produce a combustible mixture in the gas phase, a porous catalytic bed arranged in a downstream section of said tube and accommodating the ready passage therethrough of the combustible mixture in the gas phase and characterized by producing flameless catalytic combustion thereof in order to produce hot flue gases, a preheater operatively associated with the downstream section of said tube and operatively connected to said aspirator, a tank adapted to contain liquid fuel and operatively connected to said preheater, and a conduit having an adit connected to the exit of said tube and an exit communicating with the atmosphere, whereby a stream of the hot flue gases passes through said conduit, said generator being arranged in good heat-exchange relation with said conduit, whereby heating of the strong liquor in said generator effects the liberation of refrigerant in the vapor phase from the liquid absorbing medium of the strong liquor in a known manner.

6. Apparatus comprising heat-insulating structure defining a chamber and other structure cooperating with said heat-insulating structure to define a machinery compartment arranged exteriorly of said chamber, an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, said evaporator being disposed in good heat-exchange relation with said chamber to cool the same, said absorber and said generator and said condenser being disposed in said machinery compartment, a flameless combustion heater disposed in said machinery compartment and including a catalytic bed that is characterized by producing flameless catalytic combustion of a combustible mixture in the gas phase with the consequent production of hot flue gases, means for supplying a combustible mixture in the gas phase to said flameless combustion heater, said flameless combustion heater being arranged in good heat-exchange relation with said generator, whereby heating of the strong liquor in said generator effects the liberation of the refrigerant in the vapor phase from the liquid absorbing medium of the strong liquor in a known manner, and means for passing a coolant into good heat-exchange relation with said absorber and said condenser.

7. A mobile vehicle comprising a body, said body including heat-insulating structure defining therein a lading chamber and other structure cooperating with said heat-insulated structure to define therein both a machinery compartment and a fuel compartment both arranged exteriorly of said lading chamber, an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, said evaporator being disposed in good heat-exchange relation with said lading chamber to cool the same, said absorber and said generator and said condenser being disposed in said machinery compartment, a flameless combustion heater disposed in said machinery compartment and including a catalytic bed that is characterized by producing flameless catalytic combustion of a combustible mixture in the gas phase with the consequent production of hot flue gases, means for supplying a combustible mixture in the gas phase to said flameless combustion heater, said combustible mixture consisting essentially of a vaporized liquid fuel and air, a preheater disposed in said machinery compartment and arranged in good heat-exchange relation with said flameless combustion heater and connected to said last-mentioned means to supply thereto vaporized liquid fuel, a fuel tank arranged in said fuel compartment and connected to said preheater to supply thereto liquid fuel, said flameless combustion heater being arranged in good heat-exchange relation with said generator, whereby heating of the strong liquor in said generator effects the liberation of the refrigerant in the vapor phase from the liquid absorbing medium of the strong liquor in a known manner, and means for passing a coolant into good heat-exchange relation with said absorber and said condenser.

8. A container arranged to be transported selectively as the body of a road semi-trailer and as the body of a railway car; said container comprising heat-insulating structure defining therein a lading chamber and other structure cooperating with said heat-insulating structure to define therein both a machinery compartment and a fuel compartment both arranged exteriorly of said lading chamber, an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, said evaporator being disposed in good heat-exchange relation with said lading chamber to cool the same, said absorber and said generator and said condenser being disposed in said machinery compartment, a flameless combustion heater disposed in said machinery compartment and including a catalytic bed that is characterized by producing flameless catalytic combustion of a combustible mixture in the gas phase with the consequent production of hot flue gases, means for supplying a combustible mixture in the gas phase to said flameless combustion heater, said combustible mixture consisting essentially of a vaporized liquid fuel and air, a preheater disposed in said machinery compartment and arranged in good heat-exchange relation with said flameless combustion heater and connected to said last-mentioned means to supply thereto vaporized liquid fuel, a fuel tank arranged in said fuel compartment and connected to said preheater to supply thereto liquid fuel, said flameless combustion heater being arranged in good heat-exchange relation with said generator, whereby heating of the strong liquor in said generator effects the liberation of the refrigerant in the vapor phase from the liquid absorbing medium of the strong liquor in a known manner, and means for passing a coolant into good heat-exchange relation with said absorber and said condenser.

9. Apparatus comprising an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, an internal combustion engine, means for initiating operation of said internal combustion engine, a dynamo electric machine driven by said internal combustion engine, a flameless combustion heater including a catalytic bed that is characterized by producing flameless catalytic combustion of a combustible mixture in the gas phase with the consequent production of hot flue gases, a first motor means driven by said dynamo electric machine for supplying a combustible mixture in the gas phase to said flameless combustion heater, a thermostat responsive to the temperature of a medium cooled by said evaporator, said flameless combustion heater being arranged in good heat-exchange relation with said generator, whereby heating of the strong liquor in said generator effects the liberation of the refrigerant in the vapor phase from the liquid absorbing medium of the strong liquor in a known manner, second motor means operated by said dynamo electric machine for circulating the medium to be cooled into heat-exchange relation with said evaporator, and means governed by said thermostat for selectively controlling operation of said second motor means.

10. A mobile vehicle comprising a body, said body including heat-insulating structure defining therein a lading chamber and other structure cooperating with said heat-insulating structure to define therein both a machinery compartment and a fuel compartment both arranged exteriorly of said lading chamber, a space heater arranged in good heat-exchange relation with said lading chamber to heat the same, a flameless combustion heater disposed in said machinery compartment and including a catalytic bed that is characterized by producing flameless catalytic combustion of a combustible mixture in the gas phase with the consequent production of hot flue gases, means for supplying a combustible mixture in the gas phase to said flameless combustion heater, said combustible mixture consisting essentially of a vaporized liquid fuel and air, a preheater disposed in said machinery compartment and arranged in good heat-exchange relation with said flameless combustion heater and connected to said last-mentioned means to supply thereto vaporized liquid fuel, a fuel tank arranged in said fuel compartment and connected to said preheater to supply thereto liquid fuel, and means for transferring heat from said flameless combustion heater to said space heater.

11. A container arranged to be transported selectively as the body of a road semi-trailer and as the body of a railway car; said container comprising heat-insulating structure defining therein a lading chamber and other structure cooperating with said heat-insulating structure to define therein both a machinery compartment and a fuel compartment both arranged exteriorly of said lading chamber, a space heater arranged in good heat-exchange relation with said lading chamber to heat the same, a flameless combustion heater disposed in said machinery compartment and including a catalytic bed that is characterized by producing flameless catalytic combustion of a combustible mixture in the gas phase with the consequent production of hot flue gases, means for supplying a combustible mixture in the gas phase to said flameless combustion heater, said combustible mixture consisting essentially of a vaporized liquid fuel and air, a preheater disposed in said machinery compartment and arranged in good heat-exchange relation with said flameless combustion heater and connected to said last-mentioned means to supply thereto vaporized liquid fuel, a fuel tank arranged in said fuel compartment and connected to said preheater to supply thereto liquid fuel, and means for transferring heat from said flameless combustion heater to said space heater.

12. In a combination heating and cooling system, a space heater, an absorption refrigerating machine including an evaporator and an absorber and a generator and a condenser connected in an operative circuit, said generator containing a body of strong liquor that consists essentially of a liquid absorbing medium and a refrigerant absorbed by the liquid absorbing medium, a tube having an adit and an exit, the adit of said tube communicating with the atmosphere, means for producing flow of an air stream through said tube, an injector operatively associated with an upstream section of said tube and operative to inject into the air stream passing therethrough a combustible substance in order to produce a combustible mixture in the gas phase, a porous catalytic bed arranged in a downstream section of said tube and accommodating the ready passage therethrough of the combustible mixture in the gas phase and characterized by producing flameless catalytic combustion thereof in order to produce hot flue gases, a valve including an inlet and first and second outlet and a two-position mechanism for selectively connecting said valve inlet to said first and second valve outlets, the inlet of said valve being connected to the exit of said tube, a first conduit having an adit connected to the first outlet of said valve and an exit communicating with the atmosphere, a second conduit having an adit connected to the second outlet of said valve and an exit communicating with the atmosphere, whereby a stream of hot flue gases passes into said valve and is then selectively passed through said first and second conduits, said first conduit being arranged in good heat-exchange relation with said space heater, said second conduit being arranged in good heat-exchange relation with said generator, whereby heating of the strong liquor in said generator effects the liberation of the refrigerant in the vapor phase from the liquid absorbing medium of the strong liquor in a known manner, and means for selectively controlling the position of said valve two-position mechanism.

13. The combination heating and cooling system set forth in claim 12, and further comprising first motor means operative to circulate a medium over said space heater so as to effect heating thereof, second motor means operative to circulate a medium over said evaporator so as to effect cooling thereof, first thermostatic controlled means for governing said first motor means, and second thermostatic controlled means for governing said second motor means.

References Cited by the Examiner

UNITED STATES PATENTS

| | | | |
|---|---|---|---|
| 1,183,939 | 5/1916 | Whittelsey | 122—26 X |
| 1,347,631 | 7/1920 | Herck | 158—96 |
| 1,753,897 | 4/1930 | Loeb | 158—96 |
| 1,906,335 | 5/1933 | Rathburn | 158—96 X |
| 1,981,952 | 11/1934 | Foss | 126—101 X |
| 1,985,636 | 12/1934 | Foss | 165—43 |
| 2,017,579 | 10/1935 | Anderson | 165—43 |
| 2,065,251 | 12/1936 | Sweeley et al. | 237—5 |
| 2,234,869 | 3/1941 | Loveless | 126—101 |
| 2,345,204 | 3/1944 | Lodwig | 165—42 X |
| 2,529,915 | 11/1950 | Chausson | 237—2 |
| 2,592,712 | 4/1952 | Knoy | 62—238 X |
| 2,990,694 | 7/1961 | Kummerlowe et al. | 62—141 |
| 2,997,031 | 8/1961 | Ulmer | 122—4 |
| 3,057,400 | 10/1962 | Wagner | 158—99 |
| 3,080,729 | 3/1963 | Grubb | 62—497 |

ROBERT A. O'LEARY, *Primary Examiner.*

CHARLES SUKALO, *Examiner.*

M. A. ANTONAKAS, *Assistant Examiner.*